(12) United States Patent
Ducrot et al.

(10) Patent No.: US 11,213,979 B2
(45) Date of Patent: Jan. 4, 2022

(54) OR RELATING TO THREE DIMENSIONAL MOULDINGS

(71) Applicant: HEXCEL REINFORCEMENTS SASU, Dagneux (FR)

(72) Inventors: Mayeul Ducrot, Viviers du Lac (FR); Sylvain Delalande, Le Bourget du Lac (FR)

(73) Assignee: HEXCEL REINFORCEMENTS SASU, Dagneux (FR)

( * ) Notice: Subject to any disclaimer, the term of this patent is extended or adjusted under 35 U.S.C. 154(b) by 235 days.

(21) Appl. No.: 16/467,709

(22) PCT Filed: Dec. 13, 2017

(86) PCT No.: PCT/EP2017/082578
§ 371 (c)(1),
(2) Date: Jun. 7, 2019

(87) PCT Pub. No.: WO2018/114516
PCT Pub. Date: Jun. 28, 2018

(65) Prior Publication Data
US 2020/0009768 A1    Jan. 9, 2020

(30) Foreign Application Priority Data
Dec. 21, 2016    (EP) .................................... 16205834

(51) Int. Cl.
*B29C 43/00* (2006.01)
*B29C 43/02* (2006.01)
(Continued)

(52) U.S. Cl.
CPC .......... *B29C 43/003* (2013.01); *B29C 43/021* (2013.01); *B32B 5/26* (2013.01);
(Continued)

(58) Field of Classification Search
CPC ............ B32B 27/12; B29K 2105/0863; B29K 2105/12; B29K 2105/256; B29C 70/18;
(Continued)

(56) References Cited

U.S. PATENT DOCUMENTS

| 2012/0223183 A1 | 9/2012 | Boursier et al. |
| 2014/0377556 A1 | 12/2014 | Boursier |
| 2015/0031818 A1* | 1/2015 | Moser .................... B29C 35/02 524/500 |

FOREIGN PATENT DOCUMENTS

| DE | 19949318 A1 | 3/2001 |
| EP | 1211054 A1 | 6/2002 |
| WO | 2016/167136 A1 | 10/2016 |

OTHER PUBLICATIONS

International Search Report (ISR) & Written Opinion (WO) issued in the parent Patent Cooperation Treaty (PCT), Application No. PCT/EP2019/065596, dated Sep. 26, 2019.
(Continued)

*Primary Examiner* — Camie S Thompson
(74) *Attorney, Agent, or Firm* — W. Mark Bielawski

(57) ABSTRACT

The invention relates to a blank for compression moulding a part in a compression mould comprising one or more moulding recesses, said blank comprising a body formed from a first moulding compound comprising a fibrous reinforcement material and a thermo-curable resin material, and a region located on the surface of the body formed from a second moulding compound; said second moulding compound comprising a fibrous reinforcement material and a thermo-curable resin material, and exhibiting increased flow at one or more temperatures between 20° C. and the cured Tg of the first moulding compound compared to the flow of the first moulding compound at the same temperature.

10 Claims, 2 Drawing Sheets

(51) Int. Cl.
    *B32B 27/12*     (2006.01)
    *C08J 5/24*     (2006.01)
    *B32B 27/08*     (2006.01)
    *B32B 7/022*     (2019.01)
    *B32B 5/26*     (2006.01)
    *B29C 70/08*     (2006.01)
    *B29K 105/12*     (2006.01)
    *B29K 105/00*     (2006.01)

(52) U.S. Cl.
    CPC .............. *B32B 7/022* (2019.01); *B32B 27/08* (2013.01); *B32B 27/12* (2013.01); *C08J 5/241* (2021.05); *B29C 70/08* (2013.01); *B29C 2043/026* (2013.01); *B29K 2105/12* (2013.01); *B29K 2105/256* (2013.01); *B32B 2260/023* (2013.01); *B32B 2262/10* (2013.01); *B32B 2307/738* (2013.01); *Y10T 428/24994* (2015.04); *Y10T 428/24995* (2015.04)

(58) Field of Classification Search
    CPC ......... B29C 70/08; B29C 70/30; B29C 70/54; B29C 35/02; Y10T 29/49826; Y10T 428/24994; Y10T 428/24995; C08J 2300/24; C08J 2363/04; C08J 5/024; C08J 5/241; B29L 2031/3076; B29L 2031/3082; B29B 15/105
    USPC ...... 428/297.4, 367; 264/258, 250; 524/500; 29/428; 244/118.1
    See application file for complete search history.

(56) References Cited

OTHER PUBLICATIONS

International Search Report (ISR) for International Application No. PCT/EP2017/082578, dated Apr. 9, 2018.

\* cited by examiner

OR RELATING TO THREE DIMENSIONAL MOULDINGS

The present invention relates to improvements in or relating to three dimensional mouldings and in their production. In particular the invention is concerned with the production of three dimensional mouldings from two dimensional blanks. The term blank is used to describe a two dimensional mouldable material fed to a mould to be moulded and typically comprising a fibrous material contained within a matrix of an uncured or partially cured but curable resin, initially the resin may be present in particulate form such as powdered form which is melted prior to curing to flow and encase the fibrous material or the matrix may be a liquid resin. In particular the blank is made of a moulding compound such as a curable fibre reinforced matrix.

Moulding compounds are used in the production of moulded articles and can be laid up in layers in a compression mould where they are heated and compressed so that the resin flows to enclose the fibrous reinforcement and the resin is also cured such that, upon removal from the mould and cooling, a strong homogeneous moulding is obtained. This technique works satisfactorily for two dimensional mouldings, which are planar or have a gentle undulating profile. However, it is not possible to successfully mould two dimensional blanks to produce mouldings having sharp projections, such as ribs and stiffeners, particularly ribs and stiffeners extending vertically from the surface, which are frequently required in components made from moulding compounds that are used, for example, in the automobile, aircraft, wind energy, construction and sporting goods industries.

It is current practice to provide additional strips or pieces of moulding compound in the location of a protrusion such as a rib. This technique requires additional manufacturing steps and is therefore time consuming. It also results in the production of scrap material. Furthermore, it can result in imperfections on the surface of the moulding and, in particular, on the surface of the protrusion.

The present invention aims to obviate or at least mitigate the above described problems and/or to provide improvements generally.

According to the invention there is provided a blank, a process and a moulding as defined in any one of the accompanying claims.

In a preferred embodiment the present invention provides a blank for compression moulding a part in a compression mould comprising one or more moulding recesses, said blank comprising a body formed from a first moulding compound comprising a fibrous reinforcement material and a thermo-curable resin material, and a region located on the surface of the body formed from a second moulding compound; said second moulding compound comprising a fibrous reinforcement material and a thermo-curable resin material, and exhibiting increased flow at one or more temperatures between 20° C. and the Tg of the first moulding compound compared to the flow of the first moulding compound at the same temperature.

In a further embodiment the present invention provides a process for producing a moulding comprising a moulding body having one or more protuberances projecting thereform, said process comprising providing a compression mould comprising a mould cavity and one or more recesses in the surface of the mould cavity corresponding to the one or more protuberances, placing a blank according to the present invention into the mould cavity, and compression moulding the blank under conditions such that the second moulding compound preferentially flows into the one or more recesses in the surface of the mould cavity, and so that the resins of the first and second moulding compounds are cured.

The invention therefore provides a simpler process for the production of three dimensional mouldings from two dimensional blanks of curable material. Additionally the mouldings produced in the invention can have an improved surface finish because the surface including the projections that are part of the three dimensional structure are continuous with the planar surface of the moulding from which they project.

Accordingly in a further embodiment the present invention provides a three dimensional moulding formed by a process according to the present invention comprising a moulding body and one or more protuberances projecting therefrom.

In this invention the mould cavity is the space within the mould available for the compression moulding of moulding material. The cavity may have a complex three dimensional shape, and the term recesses is used to describe the spaces in the mould walls into which the moulding compound can flow during the moulding process to produce protuberances, such as ribs on the moulding.

The invention is particularly useful in the production of mouldings provided with upstanding, typically vertical, reinforcing or strengthening sections, such as ribs or other stiffeners, as are required in components useful in the automobile, aerospace, construction, wind energy and sporting goods industries. The invention is applicable to mouldings of any size and shape. In the present invention, the second moulding compound exhibits increased flow at one or more temperatures between 20° C. and the cured Tg of the first moulding compound compared to the flow of the first moulding compound at the same temperature. Thus, when a blank according to the present invention is heated to a temperature corresponding to the temperature at which the second moulding compound exhibits increased flow compared to the first moulding compound, the second moulding compound will flow more easily than the first moulding compound, and will therefore preferentially flow into recesses in the surface of the mould in which the blank is moulded. Thus the recesses in the surface of the mould will be filled with the second moulding compound before the moulding compounds are cured, improving the fill of the cavities, and in turn leading to better definition of the protuberances corresponding to the cavities once the cured moulding body is removed from the mould.

Blanks according to the present invention may be used without the need to make cuts in the surface thereof to promote the flow of material in to mould recesses, and are therefore simpler, quicker and cheaper to use than conventional blanks.

In a preferred embodiment of the invention, the second moulding compound exhibits increased flow at one or more temperatures between 100° C. and 250° C. compared to the flow of the first moulding compound at the second temperature, more preferably at one or more temperatures between 120° C. and 200° C., such as 150° C.

In a particularly preferred embodiment of the invention, the second moulding compound exhibits increased flow at all temperatures between 100° C. and 250° C. compared to the flow of the first moulding compound at the second temperature.

The differences in the flow of the first and second moulding compounds at particular temperatures may be achieved in any suitable manner. For example, in a particular embodiment of the invention, the differences in the flow may be due to differences in the viscosities at particular temperatures of the resins forming the first and second moulding compounds. Thus, in a particular embodiment of the invention, the resin material of the second moulding compound may have a lower viscosity than the viscosity of the resin material of the first moulding compound at the one or more temperatures at which the second moulding compound exhibits increased flow compared to the flow of the first moulding compound at the same temperature. The differences in the viscosities of the first and second resin materials may be due to any suitable reason, such as the use of different resin components and/or the inclusion of viscosity modifying components in one or both resin materials.

Alternatively or additionally, the differences in the flow may be due to differences in the length of the fibrous reinforcement forming the first and second moulding compounds. Thus, in a particular embodiment of the invention, the fibrous reinforcement material of the second moulding compound may be of shorter length than the length of the fibrous reinforcement material of the first moulding compound.

In certain embodiments of the invention, both the viscosities of the resin materials and the lengths of the fibrous reinforcement materials of the first and second moulding compounds may be different, but preferably the first and second moulding compounds are as similar as possible (in order to maintain the properties of the components moulded therefrom), whilst satisfying the above requirements relating to flow at certain temperatures. Preferably therefore, either a) the first and second moulding compounds comprise the same resin materials (having the same viscosities at all temperatures) but the lengths of the fibrous reinforcement materials of the two moulding compounds differ, or b) the lengths of the fibrous reinforcement materials of the two moulding compounds are the same but the viscosities of the resin materials of the two moulding compounds differ at least at one temperature between 20° C. and the Tg of the first moulding compound.

The present invention is applicable to the production of three dimensional mouldings from any moulding compounds which can be moulded at elevated temperature and under pressure to cause the resin material of the moulding compound to flow and cure. The resin material of each of the first and second moulding compounds can therefore be any thermo-curable resin such as a polyester resin, a vinylester resin, a polyurethane resin, a bismaleimide resin, a cyanate resin or an epoxy resin, and can be a particulate material, such as a powder, which melts and flows around the fibre during moulding. Alternatively the resins may be liquids, and liquid epoxy resins are preferred. Preferably, the resin material of the first moulding compound and the resin material of the second moulding compound are identical, or differ only with respect to their viscosity at certain temperatures, for example due to differences in the blends of resins from which they are formed and/or the presence of viscosity modifying components.

The fibrous reinforcement of each of the first and second moulding compounds may be any of the traditionally used reinforcing fibres such as glass, carbon, graphite, boron ceramic or aramid fibres. Carbon fibre is preferred, and it is preferred that the carbon fibre comprise short randomly oriented fibres. A preferred moulding compound for use in this invention comprises a liquid or particulate epoxy resin matrix containing randomly oriented short fibres, such as the Hex MC materials available from Hexcel.

In one particular embodiment of the present invention, the fibrous reinforcement material of the first moulding compound and the fibrous reinforcement material of the second moulding compound are formed from the same material, and are either identical materials or differ only with respect to their length. In an alternative embodiment of the present invention, the fibrous reinforcement material of the first moulding compound and the fibrous reinforcement material of the second moulding compound are formed from different materials, and either have identical lengths or different lengths. For example, the fibrous reinforcement material of the first moulding compound may comprise carbon fibres and the fibrous reinforcement material of the second moulding compound may comprise glass fibres, and the carbon fibres may have the same lengths as the glass fibres or the lengths of the carbon and glass fibres may be different.

In certain preferred embodiments of the present invention, the fibrous reinforcement material of the first moulding compound has a length of at least 50 mm, for example between 50 mm and 200 mm.

In certain preferred embodiments of the present invention, the fibrous reinforcement material of the second moulding compound has a length of from 5 mm to 50 mm.

A preferred molding compound for use in this invention is sometimes referred to as a "quasi-isotropic chopped molding compound", which means a moulding compound that is provided as a mat made up of randomly oriented "chips" of chopped unidirectional tape, as described in United States Patent Application Publication 2012/0223183. The size of the chips may be varied depending upon the particular component being made. Typically the chips are about 0.8 cm wide, 5 cm long and 0.015 cm thick. The chips include unidirectional fibers that can be carbon, glass, aramid, polyethylene, or any of the fibers types that are commonly used in the reinforcement of curable resins. Carbon fibers are preferred. The chips are randomly oriented in the mat and they lay relatively flat. This provides the mat with its transverse isotropic properties. Preferably the first moulding compound and/or the second moulding compound comprises quasi-isotropic chopped moulding compound.

The chips also include a resin matrix that can be any of the above resins commonly used in curable molding compounds. Epoxy resins are preferred. The resin content of the chips may also be varied depending upon structural or other requirements of the component being made. Chips with resin contents of 35 to 50 wt % are preferred.

The quasi-isotropic chopped moulding compound can be made from unidirectional prepreg tape of desired width. The tape is chopped into chips of desired length and the chips are laid flat and pressed together to form a mat of randomly oriented chips. The chips bond together due to the presence of the molding compound resin. The preferred material is commercially available quasi-isotropic chopped moulding compound, such as the quasi-isotropic chopped moulding compound material available from Hexcel Corporation under the tradename HexMC®. A variety of HexMC® quasi-isotropic chopped moulding compounds are available that are made from unidirectional tapes that are available under the tradename HexPly®. Similar materials are described in United States Patent Application Publication 2014/0377556.

The proportion of the surface of the body formed from the first moulding compound covered by the second moulding compound and/or the number of regions formed from the second moulding compound on the surface of the body formed from the first moulding compound may be selected based on any suitable considerations, such as the number of protuberances to be formed on the surface of the moulding body (and therefore the number of recesses in the surface of the mould to be filled), the shape and/or depth of recesses to be filled and the intended moulding and curing conditions. Thus, in preferred embodiments of the present invention the region formed from the second moulding compound covers from 5% to 100% of the surface of the body. Additionally or alternatively, in preferred embodiments there are two or more regions formed from the second moulding compound located on the surface of the body.

The blanks of the present invention may be formed in any convenient manner, for example a body may be formed from a first moulding compound in any conventional manner, and a second moulding compound may be deposited on the surface of the body at one or more regions, or the entire surface of the body may be covered in a layer of the second moulding compound.

When the bodies of the blanks according to this invention are based on moulding compound based on liquid resins they may be produced by impregnating the fibrous material with the epoxy resin. In order to increase the rate of impregnation, the process is preferably carried out at an elevated temperature so that the viscosity of the resin in reduced. However it must not be so hot for a sufficient length of time that premature curing of the resin occurs. Thus, the impregnation process is preferably carried out at temperatures in the range of from 40° C. to 80° C.

When forming a body of a blank according to the present invention the resin material can be spread onto the external surface of a roller and coated onto a paper or other backing material to produce a layer of curable resin. The resin material can then be brought into contact with the fibrous reinforcement for impregnation perhaps by the passage through rollers.

The resin may be present on one or two sheets of backing material, which are brought into contact with the structural fibrous layer and by passing them through heated consolidation rollers to cause impregnation. Alternatively the resin can be maintained in liquid form in a resin bath either being a resin that is liquid at ambient temperature or being molten if it is a resin that is solid or semi-solid at ambient temperature. The liquid resin can then be applied to a backing employing a doctor blade to produce a resin film on a release layer such as paper or polyethylene film. The structural fibrous layer may then be placed into the resin and optionally a second resin layer may be provided on top of the fibrous layer to produce the moulding compound.

A backing sheet can be applied either before or after impregnation of the resin. However, it is typically applied before or during impregnation as it can provide a non-stick surface upon which to apply the pressure required for causing the resin to impregnate the fibrous layer.

Once prepared the moulding compound may be rolled-up, so that it can be stored for a period of time. It can then be unrolled and cut into blanks as desired and laid up with other blanks to form a stack in a mould. The appropriate part of the uppermost or lowermost layer or layers in the stack at the location where the guide is to be provided and where protuberances are to be formed may be removed, preferably prior to placement in the mould.

Where the bodies of the blanks of the present invention are based on quasi-isotropic chopped moulding compound, they may be formed from a mat of material formed from chips of unidirectional material according to known processes.

The second moulding compound used in the blanks of the present invention may be formed in the same or different way to the bodies of the blanks.

It is preferred that the resins used in the moulding compound blanks that are used in the present invention are epoxy resins, and we prefer to use fast cure epoxy resins. The curing of epoxy resin is an exothermic reaction, and care must be taken to avoid reaction runaway and the overheating of the material in the mould, which can cause damage to both the moulding materials and the mould itself.

Another important property for many blanks is that prior to curing they can be readily handled, transported and laid up in a mould ready for curing. Additionally, it is desirable to eliminate or minimise the presence of captured air pockets within or between the blanks, as these can lead to irregularities in the cured structure. The blanks preferably have sufficient strength to enable them to be laid up in stacks combined with a low level of tack so that they can be readily handled and will not pick up dirt and other impurities.

In addition, once cured the epoxy based structure can have a glass transition temperature (Tg) above which the moulding is not sufficiently self-supporting to enable it to be removed from the mould. In this situation it is necessary to allow the moulding to cool down to below the Tg before it can be removed from the mould, or to directly cool the moulding before removal from the mould, for example by blowing compressed air over the mould and/or moulding to promote cooling. There is therefore a desire to produce laminar structures from blanks in which the resin when cured has a high glass transition temperatures (Tg) to enable the cured material to be sufficiently stiff to be removed from the mould shortly after curing or upon curing to a desired level, typically at least 95%. It is therefore preferred that the Tg be at or near the maximum temperature. Increase in the Tg may be achieved by using a more reactive resin. However the higher the reactivity of the resin the greater the heat released during curing of the resin in the presence of hardeners and accelerators which can increase the need for dwell time and delay before removal from the mould.

Resins can be characterised by their Phase angle. The Phase angle is used to describe the physical state of the resin. The Phase angle is low when the resin will not flow and is a solid or semi sold; and the Phase angle increases as the ability to flow increases, for example when the temperature of the resin is increased. However in epoxy resin systems that contain a curative which is normally heat activated, the cross linking action of the epoxy resin due to the action of the curative will cause the resin to harden and the phase angle to drop at elevated temperature. The Phase angle can therefore be used to determine the form of the resin and the temperature at which a moulding will be sufficiently solid to be readily removed from the mould. The moulding conditions used in this invention therefore seek to reduce the temperature at which the desirable lower Phase angle is obtained and/or to reduce the moulding time required to reach the desirable low Phase angle. When a Phase angle below 20° C., preferably below 15°, more preferably below 10° is reached, a moulding can be removed from the mould. Additionally the phase angle should be such that the resin will flow in the direction determined by the guides in order to enter any recesses in the mould cavity.

The desire for higher Tg and low Phase angle in the mouldings produced by this invention is preferably balanced with requirements for handleability of the blanks and with the economic needs to minimise the time required for the moulding cycle. The moulding cycle for the blanks involves four stages:

i) the provision (laying up) of blanks in the mould;

ii) the preferential flow of the second moulding compound under heat and pressure into recesses in the mould to create the protuberance(s);
iii) the curing reaction; and
iv) the removal of the cured product from the mould.

Additional stages may also be included. For example, a preheating stage may be included between stages i) and ii), and/or after stage iii), comprising preheating the blanks at low pressure for a short period, e.g. a few seconds, to uniformly heat up the material of the blank before it is further processed.

We therefore prefer to use epoxy resin systems which provides blanks that can be easily provided to a mould, can be rapidly caused to flow, can be cured rapidly at a particular temperature and which enables the cured material to be demoulded at temperatures near to or at the curing temperature.

We prefer to use epoxy resin formulations containing a curative that can be cured at 150° C. to 95% cure in no more than 150 seconds, and can be cured at 120° C. to 95% cu re in no more than 4 minutes to provide a cured resin having a Tg no greater than 140° C. The cured epoxy resin formulation preferably has a Phase angle below 20° at a temperature below 140° C. Preferably below 15°, more preferably below 10°. The phase angle may be above 1° or 2° or 3° or 4°.

Within this application, the cure time for the resin materials is defined as the time required for 95% cure. The Tg of the resin is measured according to Differential Mechanical Analysis according to (Test Method ASTM D7028) and the Tg is considered to be the temperature at which there is an onset of the drop in storage modulus.

The epoxy resin compositions may comprise one or more urea based curing agents and it is preferred to use from 4 to 10 wt % based on the weight of the epoxy resin of a curing agent, more preferably 4 to 6 wt %, even more preferably from 4 to 5 wt %. Preferred urea based materials are the isomers of 2,6 and 2,4 toluene bis dimethyl urea (known as 2,6 and 2,4 TDI urone), such as the range of materials available under the commercial name DYHARD® the trademark of Alzchem. The composition preferably further comprises a hardener such as dicyandiamide and it is preferred to use from 7% to 10%, more preferably from 8 to 10, most preferably from 8.5 to 9.5% by weight of the hardener. The rapid cure time is achieved by matching the ratio of the curative and the accelerator to the amount of available reactive groups in the epoxy formulation. The higher Tg is obtained by use of a resin having a functionality of at least 2 to provide sufficient reactive groups. The handleability of the prepreg is likewise determined by the nature and amount of the fibrous reinforcement and the nature and amount of the epoxy resin.

The epoxy resins used in this invention preferably have a functionality of at least 2 and an average epoxy equivalent weight (EEW) from 150 to 1500, preferably from 200 to 800, more preferably from 300 to 600 and most preferably from 200 to 500 and/or combinations thereof, the resin being curable by an externally applied temperature at 150° C. in no more than 150 seconds to provide a cured resin having a Tg no greater than 140° C. and preferably with a Phase angle when cured of less than 20° at temperatures of 140° C. or below. The fast cure and the high Tg are obtained by selecting the ratio of curative and hardener to obtain the desired reactivity of the epoxy resin. The average EEW is defined as the average molecular weight of the resin divided by the number of epoxy groups per molecule.

The blanks of the present invention are typically used at a different location from where they are manufactured and they therefore require handleability. It is therefore preferred that they are dry, or as dry as possible, and have low surface tack at ambient temperature. Accordingly it is preferred to use high viscosity resins in the production of the blanks. This also has the benefit that the impregnation of the fibrous layer is slow, allowing air to escape and to minimise void formation.

The fibre and resin volume % of a moulding material used in this invention can be determined from the weight % of fibre and resin by dividing the weight % by the respective density of the resin and carbon fibre.

The % of impregnation of a tow or fibrous material which is impregnated with resin is measured by means of a water pick up test. The water pick up test is conducted as follows. Six strips of resin impregnated reinforcement are cut of size 100 (+/−1-2) mm×100 (+/−1-2) mm. Any backing sheet material is removed. The samples are weighed to the nearest 0.001 g (W1). The strips are located between PTFE backed aluminium plates so that 15 mm of the prepreg strip protrudes from the assembly of PTFE backed plates on one end and whereby the fibre orientation of the strips extends along the protruding part. A clamp is placed on the opposite end, and 5 mm of the protruding part is immersed in water having a temperature of 23° C., relative air humidity of 50%+/−35%, and at an ambient temperature of 23° C. After 5 minutes of immersion the sample is removed from the water and any exterior water is removed with blotting paper. The sample is then weighed again W2. The percentage of water uptake WPU (%) is then calculated by averaging the measured weights for the six samples as follows: WPU (%)= ((<W2>−<W1>)/<W1>)×100. The WPU (%) is indicative of the Degree of Resin Impregnation (DRI).

Typically, the values for the resin content by weight for the uncured blanks of the present invention are in the ranges of from 15 to 70% by weight of the blank, from 18 to 68% by weight of the blank, from 20 to 65% by weight of the blank, from 25 to 60% by weight of the blank, from 25 to 55% by weight of the blank, from 25 to 50% by weight of the blank, from 25 to 45% by weight of the blank, from 25 to 40% by weight of the blank, from 25 to 35% by weight of the blank, from 25 to 30% by weight of the blank, from 30 to 55% by weight of the blank, from 35 to 50% by weight of the blank and/or combinations of the aforesaid ranges.

Typically, the values for the resin content by volume for the uncured blanks of the present invention are in the ranges of from 15 to 70% by volume of the blank, from 18 to 68% by volume of the blank, from 20 to 65% by volume of the blank, from 25 to 60% by volume of the blank, from 25 to 55% by volume of the blank, from 25 to 50% by volume of the blank, from 25 to 45% by volume of the blank, from 25 to 40% by volume of the blank, from 25 to 35% by volume of the blank, from 25 to 30% by volume of the blank, from 30 to 55% by volume of the blank, from 35 to 50% by volume of the blank and/or combinations of the aforesaid ranges.

Water pick up values for the uncured blanks of the present invention may be in the range of from 1 to 90%, 5 to 85%, 10 to 80%, 15 to 75%, 15 to 70%, 15 to 60%, 15 to 50%, 15 to 40%, 15 to 35%, 15 to 30%, 20 to 30%, 25 to 30% and/or combinations of the aforesaid ranges.

The epoxy resins of functionality at least 2 used in this invention have a high reactivity. The epoxy equivalent weight (EEW) of the resin is in the range from 150 to 1500, preferably of from 200 to 500 and the resin composition comprises the epoxy resin in combination with an accelerator or curing agent. Suitable epoxy resins may comprise blends of two or more epoxy resins selected from monofunctional, difunctional, trifunctional and/or tetrafunctional epoxy resins.

Suitable difunctional epoxy resins, by way of example, include those based on: diglycidylether of bisphenol F, diglycidyl ether of bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, aromatic epoxy resins, aliphatic polyglycidyl ethers, epoxidised olefins, brominated resins, aromatic glycidyl amines, heterocyclic glycidyl imidines and amides, glycidyl ethers, fluorinated epoxy resins, glycidyl esters or any combination thereof.

Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, by way of example, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl amines, heterocyclic glycidyl imidines and amides, glycidyl ethers, fluorinated epoxy resins, or any combination thereof. Suitable trifunctional epoxy resins are available from Huntsman Advanced Materials (Monthey, Switzerland) under the tradenames MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the tradename ELM-120.

Suitable tetrafunctional epoxy resins include N,N, N',N'-tetraglycidyl-m-xylenediamine (available commercially from Mitsubishi Gas Chemical Company under the name Tetrad-X, and as Erisys GA-240 from CVC Chemicals), and N,N,N',N'-tetraglycidylmethylenedianiline (e.g. MY0720 and MY0721 from Huntsman Advanced Materials). Other suitable multifunctional epoxy resins include DEN438 (from Dow Chemicals, Midland, Mich.) DEN439 (from Dow Chemicals), Araldite ECN 1273 (from Huntsman Advanced Materials), and Araldite ECN 1299 (from Huntsman Advanced Materials).

In order to produce final parts with substantially uniform mechanical properties using the techniques of the present invention it is important that the reinforcing fibres and the epoxy resin be mixed to provide substantially homogenous moulding compound. This requires uniform distribution of the reinforcing fibres within the moulding compound to provide a substantially continuous matrix of the resin surrounding the fibres. Where a liquid resin is employed it is therefore important to minimise the encapsulation of air bubbles within the resin during application to the fibres. It is therefore preferred to use high viscosity resins. The moulding compounds should contain a low level of voids, and it is therefore preferred that the moulding compounds have a water pick-up value of less than 9%, more preferably less than 6%, most preferably less than 3%. The water pick-up test determines the degree of waterproofing or impregnation of moulding compounds. For this purpose, a specimen of the mould compound is initially weighed and clamped between two plates in such a way that a strip of specimen 15 mm wide protrudes. This arrangement is suspended in the direction of the fibres in a water bath for 5 minutes. After removing the plates, the specimen is again weighed. The difference in weight is used as a measured value for the degree of impregnation. The smaller the amount of water picked up, the higher the degree of waterproofing or impregnation.

The blanks of the present invention may be molded using traditional layup and preform fabrication techniques. Generally, the charge is made to fit within 3.0 to 12.3 mm (⅛ to ½ inch) of the part edge or more. The lay-up will flow to fill out the part edges, produce geometrical features and the second moulding compound will preferentially flow into the cavities of the mold to form the desired protuberances.

In preferred embodiments of the present invention, at least one region formed from the second moulding compound on the surface of the body of the blank is positioned adjacent to at least one recess in the surface of the mould cavity when the blank is placed in the mould cavity. This helps to promote preferential flow of the second moulding compound into the recesses of the mould surface, improving the quality of the finished moulding.

In some embodiments of the present invention multiple blanks according to the present invention are placed in the mould cavity prior to compression moulding.

The blanks of the present invention can also be laid-up with other layers of materials which may be other composite materials (e.g. additional blanks formed from the first moulding compound used in this invention, or prepregs and/or semipregs). In other embodiments the blanks may be laid up with other layers such as layers of resin, layers of reinforcement fibres or metal foils such as steel and aluminium foil. Thus, in a preferred embodiment of the present invention one or more additional layers of material are placed in the mould cavity together with the one or more blanks according to the present invention prior to compression moulding, preferably wherein the one or more additional layers comprise one or more of blanks formed from the first moulding compound, prepregs, semipregs, resins or reinforcement fibres. In this embodiment, at least one blank according to the present invention is positioned so that it is adjacent to a surface of the mould cavity comprising one or more recesses during the moulding step, i.e. when one or more additional layers are present in the mould preferably at least one outer layer of the stack of layers comprises a blank according to the present invention.

Once they are located in the mould the blanks according to the present invention may be cured by exposure to an externally applied elevated temperature, and elevated pressure, to first cause the resins of the first and second moulding compounds to soften and flow, and for the resin of the second moulding compound to preferentially flow into the recesses in the surface of the mould cavity, and then to cure to produce a cured moulding body provided with one or more protuberances.

The exotherm due to the curing of the blanks may take the temperatures within the stack to above 110° C., however we have found that if the externally applied temperature is within the range of 70° C. to 110° C., curing of blanks based on an epoxy resin of EEW from 150 to 1500 particularly of EEW from 200 to 500 can be accomplished at a temperature of about 150° C. in less than 150 seconds to provide a cured resin having a Tg of between 130 and 140° C. and a Phase angle at 140° C. of 20° or lower, so that the cured article can be removed from the mould without undue delay.

The compression moulding may preferably be carried out at a pressure in the range of 1000 kPa to 20000 kPa.

The curing process may be carried out employing one or more externally applied temperatures for a time sufficient to cure the epoxy resin composition to the desired degree. In particular, it is preferred that the curing cycle has a duration of less than three hours. In a preferred embodiment, the compression moulding comprises moulding at a temperature in the range of 80° C. to 250° C. for 2 to 45 minutes.

When using the preferred molding compound it is preferred that the molding process be a "low flow" process. A low flow process comprises molding the quasi-isotropic chopped molding compound with a minimum disturbance of the chips' orientation, therefore preserving the transverse isotropic characteristic of the material. This is accomplished by keeping the flow of resin and fibers during the molding process at a level that does not re-orient or otherwise unduly disturb the alignment of the chips and their unidirectional fibers.

Tests conducted on finished parts have shown that low flow processing that maintains the straightened fibers in a strip, outperforms high flow processing. This performance improvement is thought to be due to the retention of the straightened fibers in the molding compound. High flow molding can destroy the chips by separating the fibers. The fibers get bent and crimped, producing a more homogeneous looking product. However, the bent and crimped fibers produce a product that does not perform as well as the product produced using low flow processing where the chips remain well defined.

It is preferred that the molding process employs a staging process that enables it to be molded at isothermal conditions. Un-staged alternatives are available with ramped press cycles or autoclave molding. Staging is an open-air oven process that generally transforms the quasi-isotropic chopped prepreg from a flexible material to a stiff solid state. Staging for 5 to 30 minutes at 150° C. to 190° C. is preferred. Staging times and temperatures are dependent on the thickness of the blank, the amount of flow desired, the amount of loading time desired and the final cure temperature. Once staged the material is allowed to cool, and can be stored in a freezer for later processing.

Final cure time is a function of the isothermal cure temperature. As a general rule, 5 minutes of cure time is added for every 0.152 cm increase in thickness, with the minimum time being set for curing a 0.3 cm part (for example 10 minutes at 205° C.). Lower isothermal cure temperatures may be used to facilitate part loading or to allow more time to equalize the charge temperature in thick parts before pressing. If staging is not desired, it is possible to lay up in the mold and perform a traditional ramp and dwell cure on the part. However, staging is preferred in order to control flow of resin during the molding process. In embodiments of the present invention, final curing is preferably carried out at 100° C. to 250° C. for 2 to 50 minutes.

Exemplary process temperatures for molding of the preferred quasi-isotropic chopped epoxy resin based blank are staging for 10 minutes at 180° C., followed by curing for 10 minutes at 205° C. The part is post cured for 2 hours at 180° C. Exemplary processing temperatures for quasi-isotropic chopped prepreg using M21 epoxy resin from Hexcel are staging for 20 minutes at 160° C., followed by curing for 45 minutes at 180° C. The part is also post cured for 2 hours at 180° C.

The blank is molded at pressures in the range of 750-2000 psi usually using matched metal molds with shear edges (0.03 cm or less). The isothermal mold temperature may range from 80° C. to 205° C., with cure times ranging from 2 to 45 minutes. High pressure molding is typically useful for making parts with complex shapes.

The cure cycles employed for curing stacks of blanks of the moulding compound as in this invention are a balance of temperature and time taking into account the reactivity of the resin and the amount of resin and fibrous reinforcement employed in the blanks. From an economic point of view it is desirable that the cycle time be as short as possible, and so curing agents and accelerators are usually included in the epoxy resin. As well as requiring heat to initiate curing of the resin, the curing reaction itself can be highly exothermic, and this needs to be taken into account in the time/temperature curing cycle, in particular for the curing of large and thick stacks of blanks. This is increasingly the case with the production of mouldings for industrial applications which require large amounts of epoxy resin, which in turn can result in excessive temperatures being generated within the stack due to the exotherm of the resin curing reaction. Excessive temperatures are to be avoided as they can damage the mould or cause some decomposition of the resin. Excessive temperatures can also cause loss of control over the cure of the resin leading to run away cure.

Generation of excessive temperatures can be a greater problem when thick sections comprising many layers of blanks are to be cured, as is becoming more prevalent in the production of fibre reinforced laminates for heavy industrial use, such as in the production of wind turbine structures, particularly wind turbine spars and shells from which the blades are assembled.

A thick stack of epoxy based blanks, such as 60 or more layers, can require cure temperatures above 100° C. for several hours. However, the cure can have a reaction enthalpy of 150 joules per gram of epoxy resin or more, and this reaction enthalpy brings the need for a dwell time during the cure cycle at below 100° C. to avoid overheating and decomposition of the resin. Furthermore, following the dwell time it is necessary to heat the stack further to above 100° C. (for example to above 125° C.) to complete the cure of the resin. It would be beneficial to employ a shorter cure cycle. In addition, the high temperatures generated can cause damage to the mould or bag materials or require the use of special and costly materials for the moulds or bags.

Upon curing, the blank forms a three dimensional moulding comprising a moulding body and one or more protuberances, such as reinforcing or stiffening ribs, suitable for use in a structural application, such as for example an automotive, marine vehicle or an aerospace structure or a wind turbine structure such as a shell for a blade or a spar or in sporting goods such as skis. Such composite laminates can comprise structural fibres at a level of from 80% to 15% by volume, preferably from 58% to 65% by volume.

This invention is suitable for the manufacture of a wide variety of components for automobiles, aerospace vehicles, wind energy devices and sporting goods that have been traditionally made using aluminum, steel, titanium and their alloys. Components produced by the processes of the present invention may also be used to replace traditional sandwiched structures. Exemplary aerospace parts include aircraft window frames, wing fairing supports, flange supports, frame gussets, rudder actuator brackets, shear ties, seat pedestals, cargo floor flange supports, storage bin fittings, antenna supports, torque tube pans, handle boxes, side guide fittings, wing box covers and intercostals. Automobile components include rails, pillars, panels, roof bows and the like. The invention enables reinforcing or stiffening ribs to be integrally molded in the component. Quasi-isotropic chopped molding compound is the preferred material for producing components where bending, riveted or bolted joints is involved and where damage tolerance is a requirement. Using quasi-isotropic chopped molding compound to make composite connectors for joining components together with bolts or rivets is preferred because open holes in the composite connector cause very little change in the performance response of the connector. It was found that the presence of a 0.6 cm hole in a component made using quasi-isotropic chopped molding compound had a negligible effect on the strength of the part. This is different from conventional molding compound where such a hole drives failure of the part. In addition, components made using quasi-isotropic chopped molding compound showed strength that is independent of loading direction when the part is loaded in the plane of the part.

The present invention is illustrated by reference to the accompanying drawings in which FIG. 1 shows a mould for use in this invention to provide a moulding body having protuberances from a stack of blanks.

Figure 1:
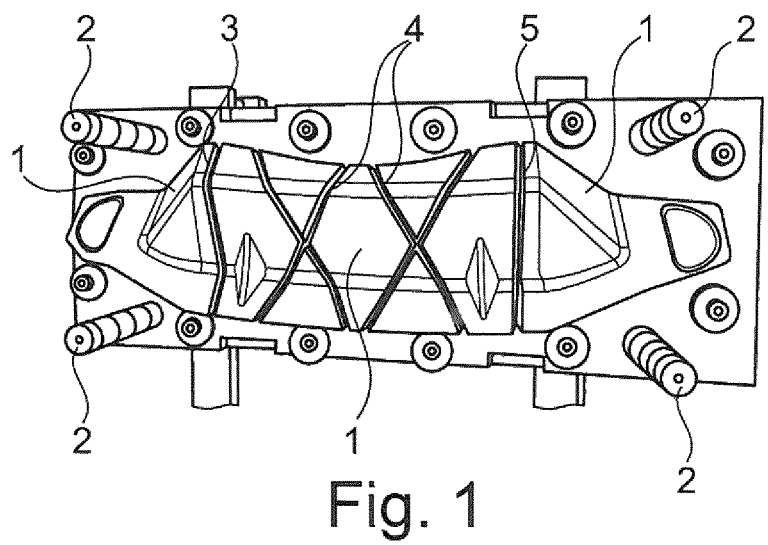
Figure 2:
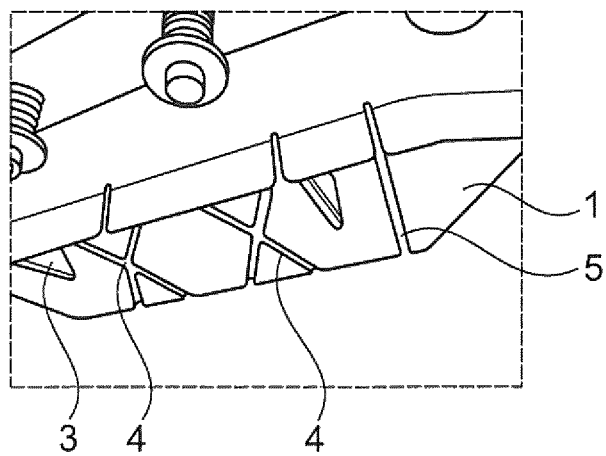
FIG. 2 is a close up of a section of the mould showing cavities for the production of ribs on the moulding.

FIG. 1 shows half of a compression mould useful in the present invention: showing the moulding surface (1) and locator pins (2) for location with the other half of the mould (not shown). The mould is provided with recesses (3), (4) and (5) where ribs are to be produced during compression moulding. FIG. 2 is a close up of the surface of the mould shown in FIG. 1.

Figure 3:
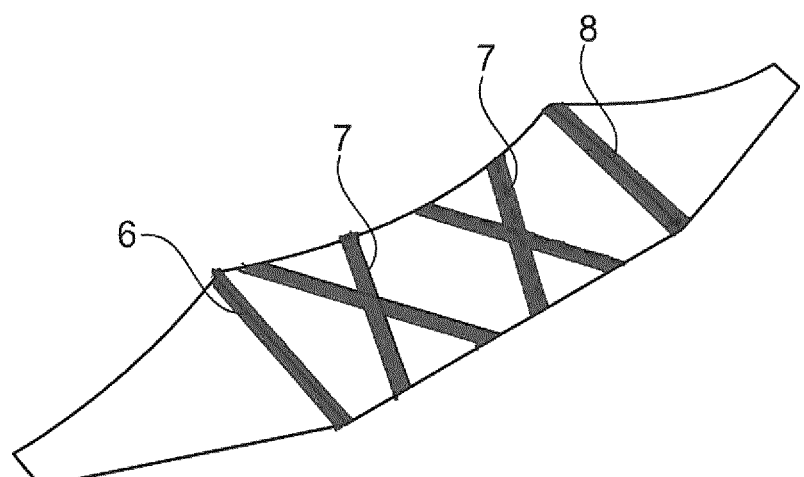
FIG. 3 shows a blank for producing comprising protuberances on the surface thereof, the blank comprising a body formed from a first moulding compound and four regions on the surface of the body formed from a second moulding compound according to this invention.

FIG. 3 shows a blank according to this invention formed from a first moulding compound in which regions (6), (7) and (8) are formed in the surface of the blank from a second moulding compound exhibiting increased flow at least at 140° C. compared to the flow of the first moulding compound at the same temperature. The regions (6), (7) and (8) are located to correspond with the recesses (3), (4) and (5) formed in the surface of the mould.

Figure 4:
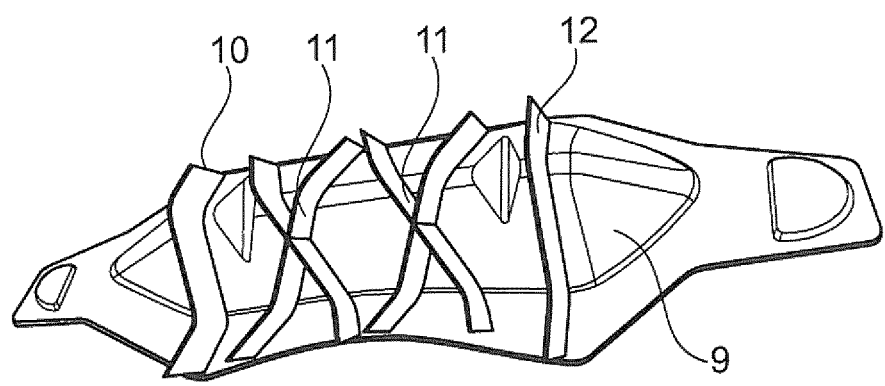
FIG. 4 shows a moulding obtained by compression moulding the blank of FIG. 3 in the mould of FIG. 1.

FIG. 4 shows the moulded blank (9) provided with the ribs (10), (11) and (12) formed at the positions corresponding to the recesses (3), (4) and (5) and corresponding generally to the locations of the regions of second moulding compound on the surface of the uncured blank (6), (7) and (8).

The invention claimed is:

1. A blank for compression moulding a part in a compression mould comprising one or more moulding recesses, said blank comprising a body formed from a first moulding compound comprising a fibrous reinforcement material and a thermo-curable resin material, and a region located on the surface of the body formed from a second moulding compound; said second moulding compound comprising a fibrous reinforcement material and a thermo-curable resin material, and exhibiting increased flow at one or more temperatures between 20° C. and the cured Tg of the first moulding compound compared to the flow of the first moulding compound at the same temperature,
   wherein the second moulding compound exhibits increased flow at one or more temperatures between 100° C. and 250° C. compared to the flow of the first moulding compound at the same temperature; and
   wherein,
   the fibrous reinforcement material of the second moulding compound is of shorter length than the length of the fibrous reinforcement material of the first moulding compound.

2. The blank according to claim 1, wherein the second moulding compound exhibits increased flow at all temperatures between 100° C. and 250° C. compared to the flow of the first moulding compound at the same temperature.

3. The blank according to claim 1, wherein the resin material of the second moulding compound has a lower viscosity than the viscosity of the resin material of the first moulding compound at the one or more temperatures at which the second moulding compound exhibits increased flow compared to the flow of the first moulding compound at the same temperature.

4. The blank according to claim 1, wherein the fibrous reinforcement material of the first moulding compound has a length of at least 50 mm.

5. The blank according to 1, wherein the fibrous reinforcement material of the second moulding compound has a length of from 5 mm to 50 mm.

6. The blank according to claim 1, wherein the fibrous reinforcement material of the first moulding compound and/or the fibrous reinforcement material of the second moulding compound comprises glass fibres, carbon fibres, graphite fibres, boron fibres, ceramic fibres or aramid fibres.

7. The blank according to claim 1, wherein the fibrous reinforcement material of the second moulding compound are formed from the same material.

8. The blank according to claim 1, wherein the fibrous reinforcement material of the first moulding compound and the fibrous reinforcement material of the second moulding compound are formed from different materials.

9. The blank according to claim 1, wherein the region formed from the second moulding compound covers from 5% to 100% of the surface of the body.

10. The blank according to claim 1, wherein there are two or more regions formed from the second moulding compound located on the surface of the body.

* * * * *